June 19, 1962 F. J. SEHN ETAL 3,039,623
AUTOMATIC PRESS MATERIAL HANDLING APPARATUS
Filed March 10, 1958 4 Sheets-Sheet 3

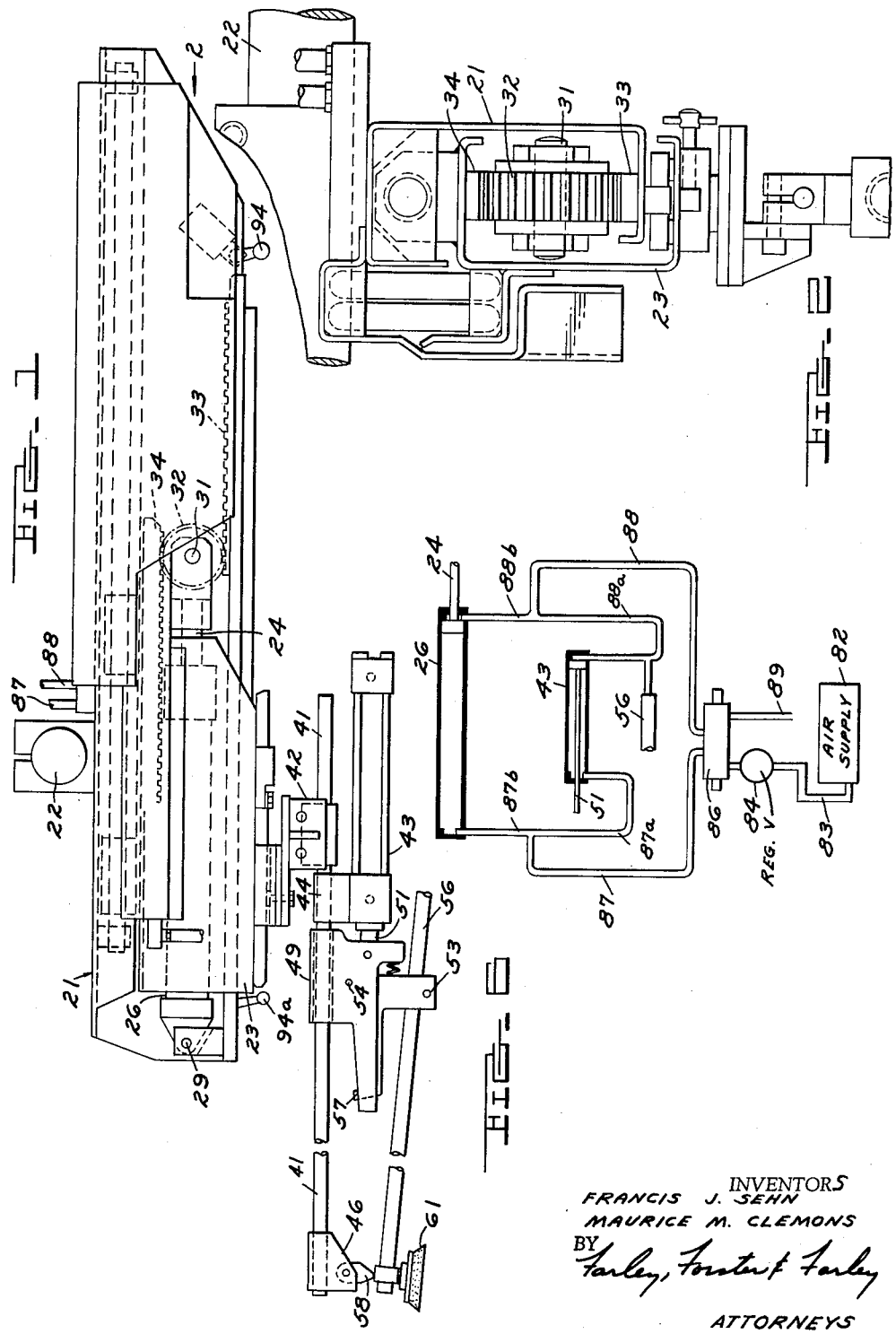

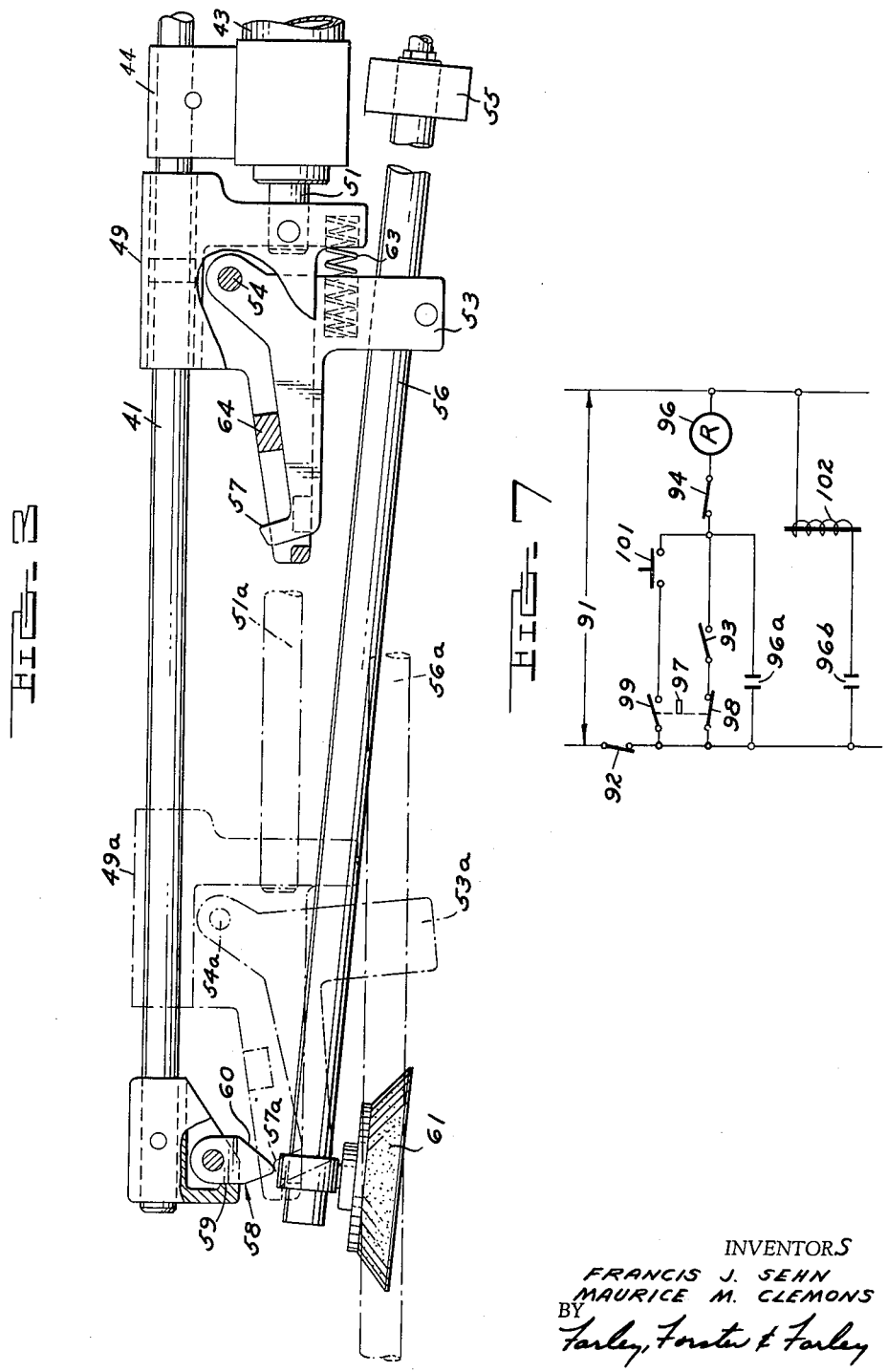

INVENTORS
FRANCIS J. SEHN
MAURICE M. CLEMONS
BY *Farley, Forster & Farley*
ATTORNEYS June 19, 1962 F. J. SEHN ETAL 3,039,623
AUTOMATIC PRESS MATERIAL HANDLING APPARATUS
Filed March 10, 1958 4 Sheets-Sheet 4

INVENTORS
FRANCIS J. SEHN
MAURICE M. CLEMONS
BY
Farley, Forster & Farley
ATTORNEYS United States Patent Office 3,039,623
Patented June 19, 1962

3,039,623
AUTOMATIC PRESS MATERIAL HANDLING
APPARATUS
Francis J. Sehn, 18089 Fenmore, Detroit, Mich., and Maurice M. Clemons, Birmingham, Mich.; said Clemons assignor to said Sehn
Filed Mar. 10, 1958, Ser. No. 720,323
2 Claims. (Cl. 214—1)

This invention pertains to means for unloading or loading a press and is an improvement over apparatus shown in our Patent 2,781,136, dated February 12, 1957.

In our previous apparatus, a reciprocable carriage assembly carries a reciprocable jaw assembly which is actuated at the end of its stroke to engage the edge of a sheet metal stamping or workpiece and to move the same relative to a press, as required in an unloading or loading operation, release being effected by reversal of the stroke of the jaw assembly. In a type unloading cycle, for example, in response to opening of the press, the jaw assembly advances and engages the edge of a completed stamping; the carriage assembly then retracts away from the press with the jaw assembly and stamping; the jaw assembly then further retracts relative to the carriage assembly releasing the stamping; and finally, the carriage assembly advances with the jaw assembly in retracted position to await completion of the next stamping and opening of the press. One air cylinder is adapted to reciprocate the carriage assembly relative to a stationary frame and a second air cylinder reciprocates the jaw assembly relative to the carriage assembly. By arranging the load versus cylinder area to require a higher pressure to actuate the carriage assembly, a common air supply line may be employed for the advance end of the jaw assembly actuating cylinder and retract end of the carriage assembly actuating cylinder, and a second common line may be employed for opposite actuation of such cylinders thereby simplifying valving and cycle controls.

In this operation, it is seen that first the jaws must be precisely placed on either side of an exposed edge of the stamping to properly grip and remove the stamping. Secondly, there must be an exposed, convenient edge of the stamping which is in alignment with the approaching jaws. Thirdly, since the jaws grip an outer edge of the stamping, a bending moment occurs about the gripped portion since the center of gravity of the stamping is substantially removed from the jaws. This, of course, limits the size of the stamping that can be removed and leads to possible damage around the gripped area of the stamping. Fourthly, since the jaws are of metal or like material, there is a danger of scratching or otherwise marring the stamping surface. And fifthly, after a number of contacts with successive stampings, the jaws must be replaced or otherwise serviced due to worn jaw surfaces which will not function properly with the close tolerances necessary for effective stamping removal.

Our present invention is directed to a modification of existing equipment which overcomes these problems with a minimum change in basic apparatus. It provides for engaging the workpiece at or near the center thereby making unnecessary edge gripping and its attendant disadvantages. There need be no convenient extending edge to the stamping or workpiece nor is bending of the stamping a problem nor is the size of the stamping limited due to the edge gripping, nor need the stamping be precisely or accurately engaged. Whether the stamping has exposed vertical or horizontal or otherwise inclined edge configurations, our present invention will handle stampings equally well. Also, with our present invention, the gripping means is a soft resilient surface instead of a hard metallic surface thereby decreasing wear and damage to the workpiece or stamping.

The above problems are solved by replacing the mechanical jaw assembly with a vacuum pickup arm actuated by our previous air cylinder elements without any additional controls or requirements for vacuum supply. The same pressure line which actuates the pistons in their respective cylinders in given directions is used to establish vacuum in the pickup member by venturi means associated with an air pressure discharge orifice so that the vacuum is present or released as required without any additional valving.

When this apparatus is adapted to remove a workpiece from a press, the pressure lines are connected so as to first move the pickup assembly forwardly to a pickup position with vacuum established and then move the carriage assembly in the opposite or rearward direction with vacuum maintained. Upon full retraction of the carriage and reversal of pressure in the cylinders, vacuum is released dropping the workpiece as the pickup assembly retracts and the carriage then moves forward to rest position with the vacuum released.

Adaptation to a loading operation may be accomplished by simply reversing two connections of the pressure line to opposite ends of one of the actuating cylinders and moving the location of one limit switch. This automatically provides for the desired change in piston directional travel and vacuum application to the pickup member as required for a loading operation. Thus, the rest position will occur with both carriage and pickup assemblies in retracted position; the pickup assembly will first advance to a preload station with vacuum established to engage the workpiece; the carriage assembly will next advance moving the pickup assembly and workpiece to loading position with vacuum maintained; reversal of pressure will release the vacuum, retract the pickup assembly and then the carriage assembly to rest position.

Also, means are provided in this invention for imparting a momentary vertical movement to the pickup arm at the end of its stroke to facilitate a pickup vacuum engagement with the workpiece.

It is, therefore, an object of this invention to provide in a press a material removal or loading means that will not mar the material surfaces.

Another object is to provide means in a press which will minimize bending stresses on the material being moved.

Another object is to provide means capable of exerting a holding force substantially near the center of gravity of the material.

Another object is to provide versatile means to remove or load parts having a large variety of shapes including parts with either vertical or horizontal edges.

Another object is to provide a vacuum pickup member for previously developed mechanical apparatus with a minimum of additional parts.

Another object is to provide a vacuum means which requires no additional valving and still automatically produces and releases vacuum at the desired intervals.

Another object is to provide a substantially vertical descent or ascent to the vacuum member when it is over the pickup area.

These and other objects and advantages will become more apparent when a preferred embodiment of the invention is considered in connection with the drawings in which:

FIGURE 1 is a side elevational view of the apparatus incorporating the present vacuum pickup assembly;

FIGURE 2 is an elevational end view of the apparatus shown in FIGURE 1 taken from the direction of arrow 2;

FIGURE 3 is an enlarged view of the vacuum pickup unit shown in FIGURE 1;

FIGURE 6 is a modification of the circuit shown in FIGURE 5;

FIGURE 7 is a control circuit for use with either of FIGURES 5 or 6; and

FIGURE 8 is a modification of the unit shown in FIGURE 3 with the vacuum arm and pickup shown in an alternate position.

Figure 5:
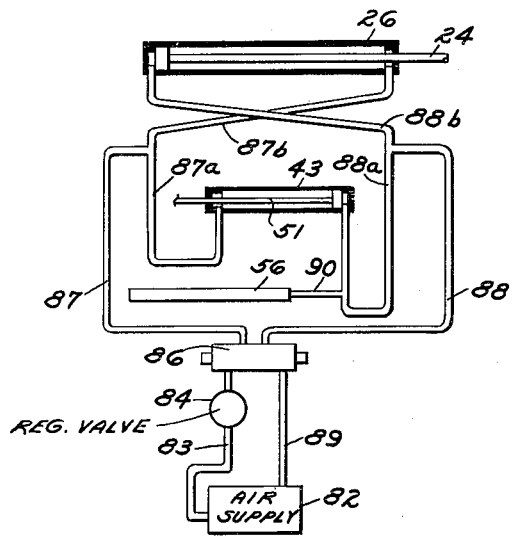
FIGURE 5 is a schematic view of a pneumatic circuit used in this invention.
Figure 5:
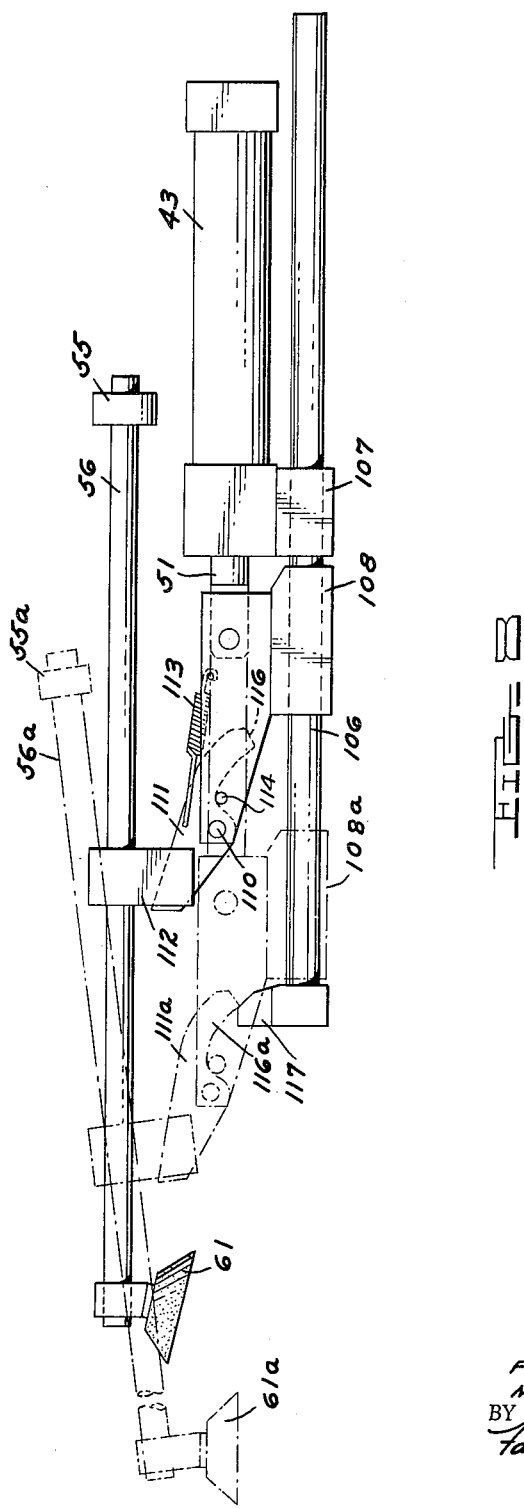

The main carriage with rack and pinion shown in FIGURES 1 and 2 and the pneumatic circuit shown in FIGURE 5 are substantially the same as those in our aforementioned Patent 2,781,136 and are similar in operation. The feature and structures that are common to both our earlier and present disclosures will be described briefly and for a more detailed explanation, reference is made to the earlier disclosure Patent No. 2,781,136. In FIGURE 1 is shown fixed frame 21 which is supported and attached to a shaft 22 extending from the frame of the press or other stationary floor support not shown. Piston rod 24 reciprocates in cylinder 26 under pressure from lines 87, 88. Cylinder 26 is attached at 29 to frame 21 and carries piston rod 24 which is attached at pivot 31 to pinion 32, which engages a lower rack 33 fixed to frame 21. Pinion 32 also engages upper rack 34 which is fixed to a reciprocable frame 23. As rod 24 is moved in cylinder 26, as by air pressure from conduits 87, 88, pinion 32 receives longitudinal movement and at the same time is rotated about its axis 31 due to its engagement with stationary rack 33. This imparts to rack 34 and movable frame 23 a velocity sum of the longitudinal movement of pinion 32 plus the movement imparted to it by the rotation of pinion 32.

In FIGURE 2 it can be seen that frames 21 and 23 are generally channel shaped in cross section with rack 33 attached to a lower leg of frame 21 and rack 34 attached to an upper leg of movable frame 23.

Looking again at FIGURE 1 it is seen that rod 41 is attached to and carried by movable frame 23 by means of clamp 42. Fixed to rod 41 are cylinder 43, clamped at 44, and pawl bracket 46. Slidable along rod 41 is crank housing 49 attached to and driven by piston 51 which is mounted and reciprocable in cylinder 43. Bell crank 53 is pivoted to housing 49 at 54 and supports bar 56 with its vertical arm and carries finger 57 on the end of its horizontal arm. As best shown in FIGURE 3, pawl 58 is pivoted to bracket 46 and is engaged by finger 57 when housing 49 is moved leftwardly by piston rod 51 to pivot bell crank 53 and bar 56 in a counter-clockwise direction, as shown in the phantom view in FIGURE 3. Attached to one end of bar 56 is vacuum cup 61 which is caused to move downwardly when finger 57 engages pawl 58 and attached to bar 56 on the opposite side of arm 53 is an adjustably slidable counterweight 55 which may be moved to positions along bar 56 corresponding to the weight to be handled by cup 61. Compression spring 63 acts between housing 49 and crank 53 urging crank 53 against stop 64, which is formed in housing 49. It is seen also in FIGURE 3, that pawl 58 has a one-way action due to the fact that it is resisted by stop 59 against clockwise rotation but is free to pivot in a counter-clockwise direction. With this construction, crank 53 will be displaced when contacting the right side of pawl 58 but will displace or rotate pawl 58 after having passed the lower end. Thus, pawl 58 will act to displace finger 57 and crank 53 downwardly on a forward or leftward stroke and will pivot out of the way in a counter-clockwise direction on a return or rightward stroke.

Figure 4:
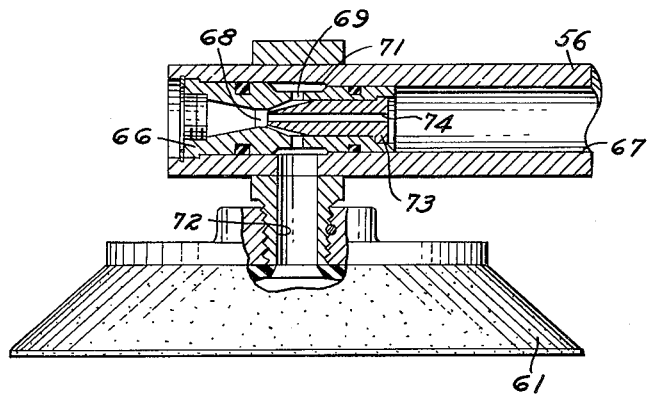
FIGURE 4 is a further enlarged partially sectioned view of the vacuum cup and venturi unit shown in FIGURES 1 and 3.

In FIGURE 4 is seen an enlarged view of the vacuum cup and venturi member. Bar 56 has axial bore 67 which periodically communicates with a pneumatic pressure source. Inserted into bore 67 is member 66 having throat 68 which communicates through port 69 with annulus 71. Annulus 71 communicates with passage 72 which is disposed centrally of vacuum cup 61. Insert 73 is fixed in member 66 and has a bore 74 providing a restricted airflow passage from the pneumatic pressure source to throat 68 and then to atmosphere at the lefthand end or opening of the venturi. It is seen then that with pressure applied to the right end of venturi 66 high air flow will cause a reduced pressure at throat 68 which will create suction in passage 72 and vacuum cup 61.

FIGURE 8 is a modification of the pickup assembly shown in FIGURE 3 with guide rod 106 being fixed by sleeve 107 to cylinder 43. Housing 108 is slidable along rod 106 and is actuated by piston rod 51 in a forward and retract direction. Pivoted to housing 108 is lever 111 which is fixed to pickup arm 56 by means of collar 112. Lever 111 is urged in a clockwise direction by spring 113 against stop 114 which is fixed to housing 108. Trailing edge 116 of lever 111 is registerable with stop 117 which is fixed to the end of guide rod 106. This registration occurs as housing 108 is moved to position 108a by the extension of piston rod 51. At the position of housing 108a, lever 111 is caused to pivot counter-clockwise to position 111a due to the engagement shown between trailing edge 116a and stop 117. Since rod 56 is attached to lever 111 it is also pivoted counter-clockwise to position 56a lowering cup 61 to position 61a where it may perform a deposit or pickup function. Upon a retract or rightward movement of piston rod 51, housing 108 is moved rightwardly along rod 106 and due to spring 113 and counterweight 55, rod 56 is pivoted clockwise lifting cup 61 as edge 116 moves rightwardly and downwardly along the surface of stop 117. This modification provides the same path of travel for the vacuum cup 61 on retraction of the pickup arm as on advance movement whereas the one way pawl 58 provides a straight path on retraction.

FIGURES 5 and 6 show schematic views of alternative pneumatic pressure systems for controlling the pressure flow to cylinders 26 and 43 and to bore 67 in the bar 56. The circuit shown in FIGURE 5 is adapted for use in a construction designed to unload a stamping from a press while the circuit shown in FIGURE 6 is adapted for a system which deposits or delivers a workpiece to a press to be stamped. If desired, there may be a pickup unit and a delivery unit for each press for both automatic loading and unloading operations.

The system for unloading a press shown in FIGURE 5 will first be described. Air supply 82 delivers air pressure to line 83 through regulator 84 to a reversing valve 86. Valve 86 has two delivery positions, one of which will deliver pressure to line 87, and exhaust line 88 to line 89 and the second position reversing this pressure distribution by supplying pressure to line 88 and exhausting line 87. Valve 86 may be any of a number of solenoid actuated valves known to the art that perform this function. Line 87 branches into lines 87a and 87b while line 88 branches into lines 88a and 88b with the branch lines going to opposite ends of cylinders 26 and 43. Attached to branch line 88a is bore 67 of arm 56, so that when there is pressure in line 88a venturi 66 shown in FIGURE 4 will produce suction at vacuum cup 61.

With reference to FIGURE 7, a suitable electrical power supply is placed across mains 91, one of which has a start-stop switch 92. The circuit may be operated automatically with movement of the stamping press, not shown, controlling switch 93 and movement of carriage 23 controlling switch 94 to operate relay 96 when switch 97 is in the upper or automatic position. When switch 97 is in the upper position, contact 98 is closed and when it is in the lower position, a semi-automatic position is obtained with contact 98 opening and contact 99 closing so that press operated contact 93 is by-passed by push button 101. When relay 96 is energized through either the automatic or semi-automatic circuit, holding contact 96a is closed and solenoid contact 96b is closed energizing solenoid 102. Contact 93 is spring urged to an open position and is closed only when the press member is in its uppermost position. Switch 101 is spring urged to an open position and is closed only when manually pressed. Contact 94 is spring urged to a closed position and is opened only when tripped by a rightward movement of carriage 23. Contact 94 is shown fixed to the right extremity of fixed frame 21 for the pickup circuit of FIGURE 5 while it is shown in phantom position to the left extremity of fixed frame 21 at 94a for the delivery or deposit circuit of FIGURE 6. When solenoid 102 is energized as by the closing of contact 96b, valve 86 is moved to a position to admit pressure to line 88 and exhaust to line 87 urging piston rod 51 leftwardly and rod 24 rightwardly.

The circuit for the delivery unit is similar to that for the pickup unit with the exception that lines 87b and 88b are connected to opposite ends of cylinder 26. The electrical circuit is similar with the exception that switch 94 is located at the left end of fixed frame 21 and is tripped by the extreme left movement of carriage 23. Solenoid 102 when energized applies pressure to line 88 and exhaust to line 87 but piston rod 24 is moved in an opposite direction. The operation of these two systems together with the carriage and vacuum assemblies will now be described.

*Operation of Circuit in FIGURE 5*

With piston rods 24 and 51 in the position of FIGURES 1 and 5, the unit is at its rest position. Assuming the circuit in FIGURE 7 to be in the automatic position, as shown, actuation of valve 86 by solenoid 102 will occur when contact 93 is closed by the press reaching its uppermost position. This completes a circuit through relay 96 since limit switch 94 is normally closed. Relay contacts 96a and 96b then close and it is seen that relay 96 is held in by contact 96a. Upon contact 96b closing, solenoid 102 is energized moving valve 86 so that pressure is applied to line 88. Branches 88a and 88b are supplied with pressure as is line 90 which leads to arm 56, creating suction at vacuum cup 61. Piston rod 51 moves leftwardly pushing housing 49 along rod 41 until it reaches position 49a shown in FIGURE 3. At this point, finger 57 of bell crank 53 engages pawl 58 moving crank 53 and arm 56 to a downward position until cup 61 contacts the stamping in the press, not shown, gripping the piece due to the presence of vacuum caused by airflow through venturi 66. As finger 57 moves past the lower end of pawl 58, the combined forces of counterweight 55 and spring 63 raise the stamping to a die clearing position.

Piston rod 51 moves to its leftwardmost position before piston rod 24 begins to move to its rightward position even though pressure is applied simultaneously to the respective piston ends due to higher pressure requirements for actuation of piston rod 24. As pressure builds up in cylinder 26 at the end of the stroke of rod 51, carriage 23 is moved to its rightwardmost position opening limit switch 94. Relay 96 and solenoid 102 are de-energized, which allows valve 86 to be spring returned to a reverse position introducing pressure to line 87 and exhausting line 88. Cup 61 loses its vacuum releasing the stamping and pressure through line 87a to the left end of cylinder 43 moves piston 51 to its extreme rightward position and then due to pressure build up in line 87b piston 24 is moved to its extreme leftward position, completing a cycle.

*Operation of the Circuit Shown in FIGURE 6*

With the circuit shown in FIGURE 6, limit switch 94 as previously mentioned, is placed near to the left extremity of frame 21, as shown at 94a, FIGURE 1. With piston rods 24 and 51 in the positions shown in FIGURE 6, the unit is ready to start a forward or delivery stroke. The loading cycle is started by closing switch 93, energizing relay 96, closing holding contact 96a and solenoid contact 96b, energizing solenoid 102 and moving valve 86 to a position which supplies pressure to line 88 and exhaust to line 87 as for the previous circuit. Suction is immediately established at cup 61 to pick up a workpiece, and piston rod 51 is actuated to the end of its stroke. Piston rod 24 then is moved to its leftwardmost or delivery position due to increased pressure in line 88b, and when reaching the delivery position will trip or open switch 94a de-energizing solenoid 102. When solenoid 102 is de-energized, valve 86 is spring urged to a position which introduces pressure to line 87 and exhaust to line 88 which will cause vacuum cup 61 to lose its vacuum due to the absence of pressure in line 90 releasing the workpiece into the press. Then there will be a rightward or retracting movement of piston rod 51 due to the pressure in line 87a, and next there will be a retracting movement of piston rod 24 due to the pressure in line 87b, returning both pistons to their rightward positions and completing a cycle.

If desired, switch 97 may be moved to its lower or semi-automatic position, opening switch 98, closing switch 99, by-passing switch 93 so that each cycle is initiated by the closing of push button 101 instead of limit switch 93.

While preferred embodiments of this invention have been described above in detail, it will be understood that numerous modifications may be resorted to without departing from the scope of the invention as defined in the following claims.

We claim:

1. An article handling apparatus of the type adapted to deliver an article to a machine such as a press or remove an article therefrom and including a pickup member, means supporting said pickup member for reciprocating movement, a two-way actuating cylinder for moving said supporting means from one position to another, a source of air pressure, valve means and connections for applying air pressure alternately from said source to each end of said actuating cylinder characterized by a suction type pickup element including a venturi mounted on one end of said pickup member, one of said connections from said valve means to said actuating cylinder including a branch line to said venturi whereby suction is automatically applied to said pickup member in response to the application and release of pressure to said cylinder to reciprocate said pickup member and supporting means in one direction.

2. Article handling apparatus of the type adapted to deliver an article to a machine such as a press or remove an article therefrom including a slide, housing means carried for reciprocating movement thereon, a pick-up arm having a suction type pickup element mounted on one end thereof, said suction type pickup element including a venturi, means supporting said arm intermediate its ends for pivotal movement relative to said housing on an axis transverse to the directions of reciprocating movement, a two-way actuating cylinder for moving said housing on said slide from one position to a second position in which said arm extends beyond one end of said slide, a pressure connection to one end of said actuating cylinder for supplying pressure for movement to said second position, said connection including a branch line leading to said venturi whereby suction is automatically created at said pickup element in response to the application of air pressure to said cylinder, means for producing pivotal movement of said arm to place the pickup element thereof in engagement with an article to be handled as said housing is moved to the said second position thereof comprising a reaction member carried by said slide and an actuating member forming part of said arm supporting means, said reaction and actuating members being arranged to impart a path of movement to said pickup element which includes a substantial component in a direction normal to the surface of the article engage thereby, and spring means between said housing and supporting means for opposing the pivotal movement imparted to said arm by said reaction and actuating members and normally urging said arm in the opposite direction of pivotal movement.

References Cited in the file of this patent

UNITED STATES PATENTS

| | | |
|---|---|---|
| 1,959,512 | Wall | May 22, 1934 |
| 2,049,850 | Lytle | Aug. 4, 1936 |
| 2,200,800 | Miller | May 14, 1940 |
| 2,247,787 | Schmidt | July 1, 1941 |
| 2,628,453 | Pye | Feb. 17, 1953 |
| 2,763,229 | Sahlin | Sept. 18, 1956 |
| 2,781,136 | Sehn | Feb. 12, 1957 |
| 2,811,266 | Udal | Oct. 29, 1957 |
| 2,910,321 | Sehn et al. | Oct. 27, 1959 |